Aug. 6, 1946.   J. C. BECKETT   2,405,177
STUD WELDING
Filed July 22, 1943
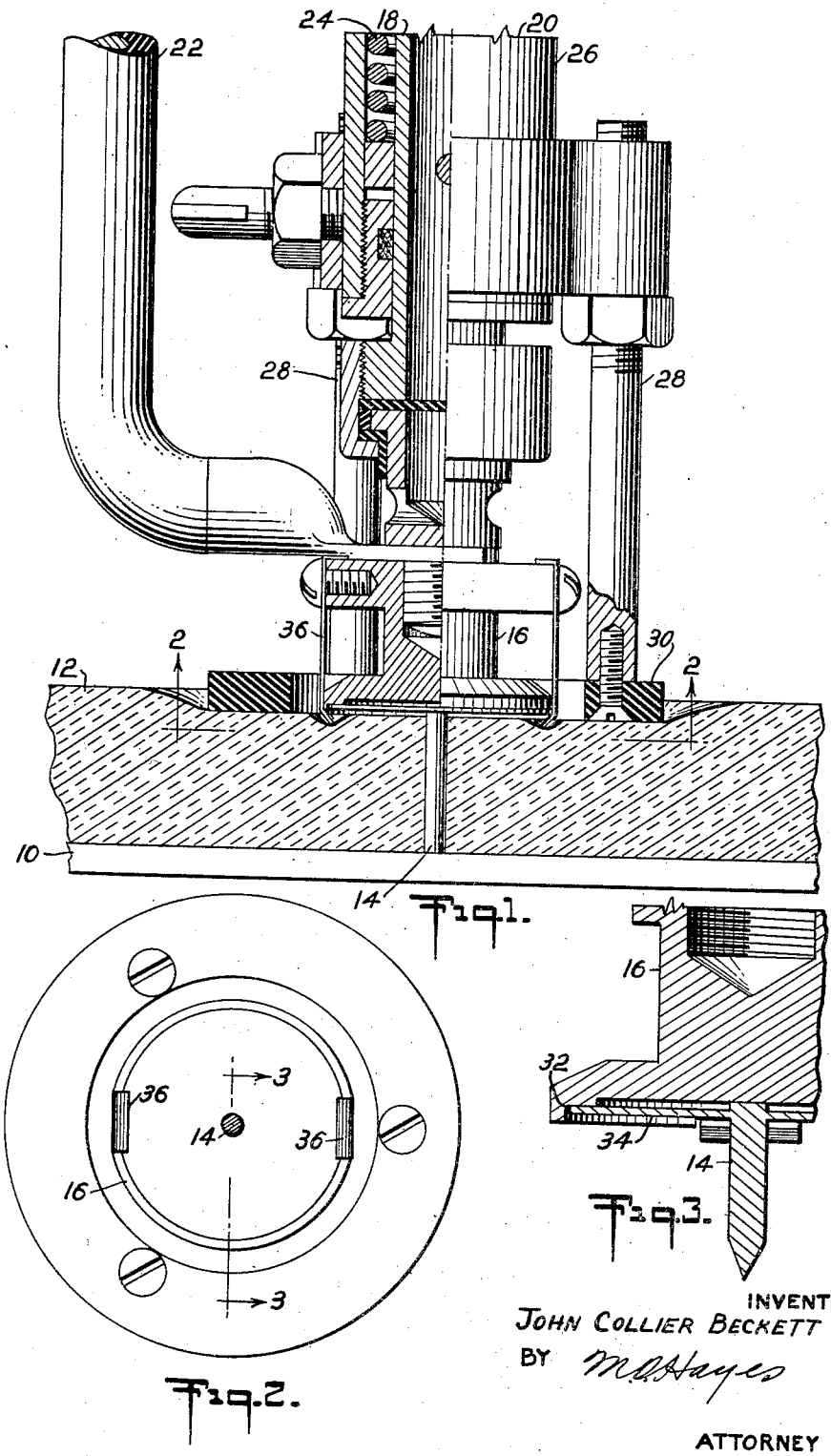
INVENTOR
JOHN COLLIER BECKETT
BY M. O. Hayes
ATTORNEY Patented Aug. 6, 1946

2,405,177

UNITED STATES PATENT OFFICE 2,405,177

STUD WELDING

John Collier Beckett, United States Navy

Application July 22, 1943, Serial No. 495,786

6 Claims. (Cl. 219—4)

(Granted under the act of March 3, 1883, as amended April 30, 1928; 370 O. G. 757)

This invention relates to a welding device including a clutch for attaching to a welding gun a unit to be welded.

In general, it is an object of the invention to provide a device which is simple of construction and easily manufactured of readily available materials, which may be repaired by workmen at the place of operation, and which may be used with safety and economy.

Another object is to provide in a welding device a clutch, to and from which the unit to be welded may be attached and detached immediately and effortlessly; to provide a clutch for holding during the welding operation the disk-shaped head of a pin to be welded; and to provide a clutch with a cooperating compressing unit for compressing material, which is to be attached by such a pin, to a thickness about equal to the length of the pin and desirably less than the length of the pin in the welding operation, as hereinafter indicated.

Other objects of the invention will, in part, be obvious, and will, in part, appear hereinafter.

The invention accordingly comprises articles of manufacture possessing the features, properties and relation of elements that will be exemplified in the articles hereinafter described, the scope of which will be indicated in the claims.

For a better understanding of the invention, reference should be had to the following description, taken in connection with the drawing, in which Fig. 1 is a view partly in cross section of a device embodying one form of the invention;

Fig. 2 is an end view of the device of Fig. 1, the trace of the plane of the view being shown at 2—2 in Fig. 1; and Fig. 3 is an enlarged section of a detail of the device shown in Fig. 1, the trace of the plane of the section being the line 3—3 in Fig. 2.

The present invention may be used with any suitable stud welding gun. It is shown here in connection with the forward end of a device more fully described in the co-pending application of Andrew W. Anderson, filed July 29, 1943, Patent No. 2,360,837, dated October 24, 1944.

Compressible material, e. g., glass wool, is often laid in a layer against a surface. It is held against the surface by flat headed pins, the points of which are inserted through the material to the surface and are then stud welded to the surface. The compressibility of the material, and the flatness of the heads of the studs or pins, had made the use of stud welding of such pins practically impossible. At successive times during the welding operation, the end of the pin must be exactly at predetermined distances from the underlying surface and at the end of the operation, the head of the pin must hold the material in a state of compression.

The present invention contemplates a device that has given completely satisfactory performances over long periods of time, the position of the pin being exactly determined at all times during the operation.

In the drawing, 10 denotes a metallic object against the surface of which a layer 12 of compressible material is to be held by pin 14. The term "pin" herein denotes any device, such as a stud, or of a similiar nature. The pin is held in a clutch 16 attached to the end of a plunger 18 in the welding gun 20. Electrical current is brought to the electrically conductive clutch through conduit 22 and flows through the pin 14 to the surface 10. The plunger and clutch, when subject to no other influence, are moved axially toward the surface 10 by spring 24.

During the operation, it is necessary that the pin be raised from the surface 10 in order that an arc may be set up to melt a portion of the pin and surface. A relative motion between the plunger and the gun casing 26 permits this, but it is necessary that the casing remain stationary so that the pin may rise. Means are provided for so holding the casing. These comprise one or more legs 28 attached to the casing and an annulus 30, preferably not electrically conductive, the forward face or sole of which is substantially in the plane of the forward end of the clutch 16.

The clutch 16 is provided with a recess or shallow circular depression 32 open at one side. The head 34 of the pin 14 is slid into the slot 32 past the resilient spring fingers 36 attached to the clutch. They support the head 34 and form, with recess 32, a slot.

The operation of the device is as follows: The casing, with the pin in the clutch, is pushed toward the surface 10 until annulus 30 has compressed material 12. The parts are arranged so that at this time the pin tip touches surface 10 and the under face of head 34 is just above the depressed surface of material 12. Current is sent through the pin which is raised by mechanism not shown. An arc is set up. Spring 24 then pushes the plunger toward surface 10; the current is automatically cut off; some of the melted pin mushrooms out as the pin returns, and is welded to surface 10, at which time the under surface of the head 34 is substantially seated against the compressed material and substantially in the plane of the under surface or sole of annulus 30. The casing is finally pulled away from surface 10, the springs 36 giving way and releasing the pin. Features of a welding pin and resulting product are contained in my co-pending application, Serial No. 591,592, filed May 2, 1945, for Stud welding.

The recess 32 may have any desired contour to fit the head of whatever pin is to be welded. Similarly, the element 30 may be of any convenient shape. It need not extend through 360°.

The invention described herein may be manufactured and used by or for the Government of the United States of America for governmental purposes without the payment of any royalties thereon or therefor.

What I claim as new and desire to secure by Letters Patent is:

1. A welding device comprising means for attaching by welding, a headed pin extending through compressible material of an initial thickness at least equal to the length of the pin, to an object against which the compressible material seats and is held by said headed pin, including a casing, a plunger movable in the casing, retaining means on the plunger for removably engaging and retaining the head of said pin on said plunger, and means fixedly mounted on said casing and disposed in close proximity to the head of the pin to engage and compress the compressible material, which is adjacent the pin, against the object and from a thickness at least equal to the length of the pin to a thickness less than the length of the pin, the said plunger and compressing means being so disposed in respect to said casing that said compressing means provides a compressing surface, when the pin is in position to be attached, at a distance from the object no greater than the length of the pin.

2. A welding device comprising means for attaching by welding, a headed pin extending through compressible material of an initial thickness greater than the length of the pin, to an object against which the compressible material seats and is held by said headed pin, including a casing, a plunger movable in the casing, retaining means on the plunger for removably engaging and retaining the head of said pin on said plunger, and means fixedly mounted on said casing and disposed in close proximity to the head of the pin to engage and compress the compressible material, which is adjacent the pin, against the object and from a thickness greater than the length of the pin to a thickness less than the length of the pin, the said plunger and compressing means being so disposed in respect to said casing that said compressing means provides a compressing surface, when the pin is in position to be attached, at a distance from the object less than the length of the pin.

3. A welding device comprising means for attaching by welding, a headed pin extending through compressible material of an initial thickness at least equal to the length of the pin, to an object against which the compressible material seats and is held by said headed pin, including a casing, a plunger movable in the casing, retaining means on the plunger for removably engaging and retaining the head of said pin on said plunger, and means fixedly mounted on said casing and disposed in close proximity to the head of the pin to engage and compress the compressible material, which is adjacent the pin, against the object and from a thickness at least equal to the length of the pin to a thickness less than the length of the pin, the said plunger and compressing means being so disposed in respect to said casing that said compressing means provides an arcuate compressing surface, when the pin is in position to be attached, at a distance from the object no greater than the length of the pin.

4. A welding device comprising casing means for said device, foot means fixedly attached to said casing means and having a sole surface, means movable in said casing for supporting a headed pin with the head in a predetermined position in relation to said casing and foot means, and means for moving said supporting means, the sole surface of said foot means being substantially in the plane of said head in its predetermined position in said supporting means when said supporting means is about at the end of its travel in said casing.

5. A welding device comprising a casing, foot means fixedly attached to said casing and providing a sole surface, means in said casing for supporting a flat-headed pin the point of which is to be welded to an object, said supporting means being movable in said casing and providing a shallow head-receiving recess at the outer end thereof, said recess having a lateral dimension much greater than its depth and much greater than the diameter of the pin to receive said flat head of the pin, the sole surface of said foot means being substantially in the plane of said shallow head-receiving recess when said supporting means is at the end of its travel in said casing.

6. A welding device comprising a casing, foot means fixedly attached to said casing and providing a sole surface, means in said casing for supporting a flat-headed pin the point of which is to be welded to an object, said supporting means being movable in said casing and providing a shallow head-receiving recess at the outer end thereof, said recess having a lateral dimension much greater than its depth and much greater than the diameter of the pin to receive said flat head of the pin, the sole surface of said foot means being substantially in the plane of said shallow head-receiving recess when said supporting means is at the end of its travel in said casing, and resilient spring fingers other than the material forming said recess, said spring fingers being attached to said supporting means and extending beyond the end thereof past said shallow recess, said resilient spring fingers having inwardly disposed portions positioned beyond said shallow recess and adapted to yieldably engage and retain the flat head of said pin in said shallow recess, the wall at the outer end of said supporting means being open at one side of said recess for lateral sliding insertion of the flat head of the pin into the recess and within the inwardly disposed portions of the spring fingers.

JOHN COLLIER BECKETT.